United States Patent
Nomura et al.

(10) Patent No.: US 12,432,086 B2
(45) Date of Patent: *Sep. 30, 2025

(54) VEHICLE CONTROL SYSTEM, CONTROL METHOD, ELECTRONIC DEVICE, AND RECORDING MEDIUM

(71) Applicant: HONDA MOTOR CO., LTD., Tokyo (JP)

(72) Inventors: Takumi Nomura, Tokyo (JP); Tatsuroh Saitoh, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 161 days.

This patent is subject to a terminal disclaimer.

(21) Appl. No.: 18/455,914

(22) Filed: Aug. 25, 2023

(65) Prior Publication Data

US 2024/0106676 A1 Mar. 28, 2024

(30) Foreign Application Priority Data

Sep. 28, 2022 (JP) ................ 2022-155132

(51) Int. Cl.
*H04L 12/40* (2006.01)

(52) U.S. Cl.
CPC .... *H04L 12/40* (2013.01); *H04L 2012/40215* (2013.01); *H04L 2012/40273* (2013.01)

(58) Field of Classification Search
CPC ........... H04L 12/40; H04L 2012/40215; H04L 2012/40273

See application file for complete search history.

(56) References Cited

U.S. PATENT DOCUMENTS 10,328,898 B2 * 6/2019 Golsch ................ B60R 25/20
11,366,508 B1 * 6/2022 Kakkireni ............ G06F 1/26
(Continued)

FOREIGN PATENT DOCUMENTS

JP  H9-83608 A   3/1997
JP  2017-50730 A  3/2017
(Continued)

OTHER PUBLICATIONS

English Translation of WO 2022/000497 (Year: 2022).*
(Continued)

*Primary Examiner* — Henry Tsai
*Assistant Examiner* — John B Roche
(74) *Attorney, Agent, or Firm* — Rankin, Hill & Clark LLP

(57) ABSTRACT

Provided is a vehicle control system that includes a first electronic device, a second electronic device, and a third electronic device. The first electronic device includes: a first electronic device transmission unit that transmits time information counted by a first electronic device timer unit and first elapsed time information that is from the start of generation of the time information till transmission of the time information generated. The second electronic device includes a second electronic device transmission unit that transmits the time information and the first elapsed time information received from the first electronic device to the third electronic device. The third electronic device includes an adjustment unit that adjusts time counted by a third electronic device timer unit based on the time information and the first elapsed time information received.

9 Claims, 4 Drawing Sheets

(56) References Cited

U.S. PATENT DOCUMENTS

| | | | |
|---|---|---|---|
| 12,212,644 B2 * | 1/2025 | Nomura | H04J 3/0682 |
| 2010/0228517 A1 * | 9/2010 | Wike, Jr. | G01S 17/14 |
| | | | 356/28 |
| 2012/0140861 A1 | 6/2012 | Menon et al. | |
| 2015/0062431 A1 * | 3/2015 | Matsuo | H04N 21/8547 |
| | | | 348/521 |
| 2017/0064661 A1 | 3/2017 | Katagiri et al. | |
| 2017/0317812 A1 * | 11/2017 | Leng | H04L 7/0037 |
| 2019/0222407 A1 | 7/2019 | Yoshida et al. | |
| 2021/0237669 A1 | 8/2021 | Toya | |
| 2021/0258136 A1 | 8/2021 | Hoffleit et al. | |

FOREIGN PATENT DOCUMENTS

| | | |
|---|---|---|
| JP | 2019-125916 A | 7/2019 |
| WO | WO-2022000497 A1 * | 1/2022 |

OTHER PUBLICATIONS

Japanese Office Action dated May 28, 2024 issued in corresponding Japanese application No. 2022-155132; English machine translation included (9 pages).

Yuichi Tokunaga, et al., "A continuous time synchronization scheme of large scale wireless sensor networks", The bulletin of Multimedia,Distributed,Cooperative,and Mobile Symposium (DICOMO) 1997-2006 edition Ver 1.1 [DVD-ROM], Information Processing Society of Japan, Jul. 5, 2006, vol. 2006,p. 793-796 (4 pages).

Ryo Kurachi, et al., "Delivery Delay Mechanisms for Controller Area Network", The technical report of embedded systems(EMB), 2019-EMB-050, Information Processing Society of Japan, Mar. 10, 2019, p. 1-5 (5 pages).

* cited by examiner

VEHICLE CONTROL SYSTEM, CONTROL METHOD, ELECTRONIC DEVICE, AND RECORDING MEDIUM

INCORPORATION BY REFERENCE

The present application claims priority under 35 U.S.C. § 119 to Japanese Patent Application No. 2022-155132 filed on Sep. 28, 2022. The content of the application is incorporated herein by reference in its entirety.

BACKGROUND OF THE INVENTION

Field of the Invention

The present invention relates to a vehicle control system, a control method, an electronic device, and recording medium of the vehicle control system.

Description of the Related Art

Conventionally, there are known technologies for implementing time synchronization between electronic devices. For example, Japanese Patent Laid-Open No. 2019-125916 discloses a technology with which a master control device and a slave control device perform time synchronization. In Japanese Patent Laid-Open No. 2019-125916, the master control device transmits a timing synchronization message storing global time to the slave control device, and the slave control device performs time setting based on the global time extracted from the timing synchronization message.

However, in the method disclosed in Japanese Patent Laid-Open No. 2019-125916, elapsed time, which is from the start of generation of a timing synchronization message to transmission of the timing synchronization message, is not taken into consideration for time synchronization. Thus, there is still room for improvement in the precision of time synchronization.

The present invention is designed in view of the aforementioned circumstance, and it is an object thereof to enable time synchronization among electronic devices with high precision.

SUMMARY OF THE INVENTION

One aspect of the present invention is a vehicle control system that includes a first electronic device, a second electronic device connected to the first electronic device, and a third electronic device connected to the second electronic device, in which the first electronic device includes: a first electronic device timer unit; a generation unit that generates time information indicating time counted by the first electronic device timer unit; and a first electronic device transmission unit that transmits the time information generated by the generation unit to the second electronic device, the first electronic device transmission unit also transmitting, to the second electronic device, first elapsed time information indicating first elapsed time that is from when the generation unit starts generation of the time information till transmitting the time information generated, the second electronic device includes: a second electronic device reception unit that receives the time information and the first elapsed time information from the first electronic device; and a second electronic device transmission unit that transmits the time information and the first elapsed time information received by the second electronic device reception unit to the third electronic device, and the third electronic device includes: a third electronic device timer unit; a third electronic device reception unit that receives the time information and the first elapsed time information from the second electronic device; and an adjustment unit that adjusts time counted by the third electronic device timer unit based on the time information and the first elapsed time information received by the third electronic device reception unit.

According to one aspect of the present invention, it is possible to implement time synchronization among the electronic devices with high precision.

DETAILED DESCRIPTION OF THE PREFERRED EMBODIMENTS

1. First Embodiment

First, a first embodiment will be described.

Figure 1:
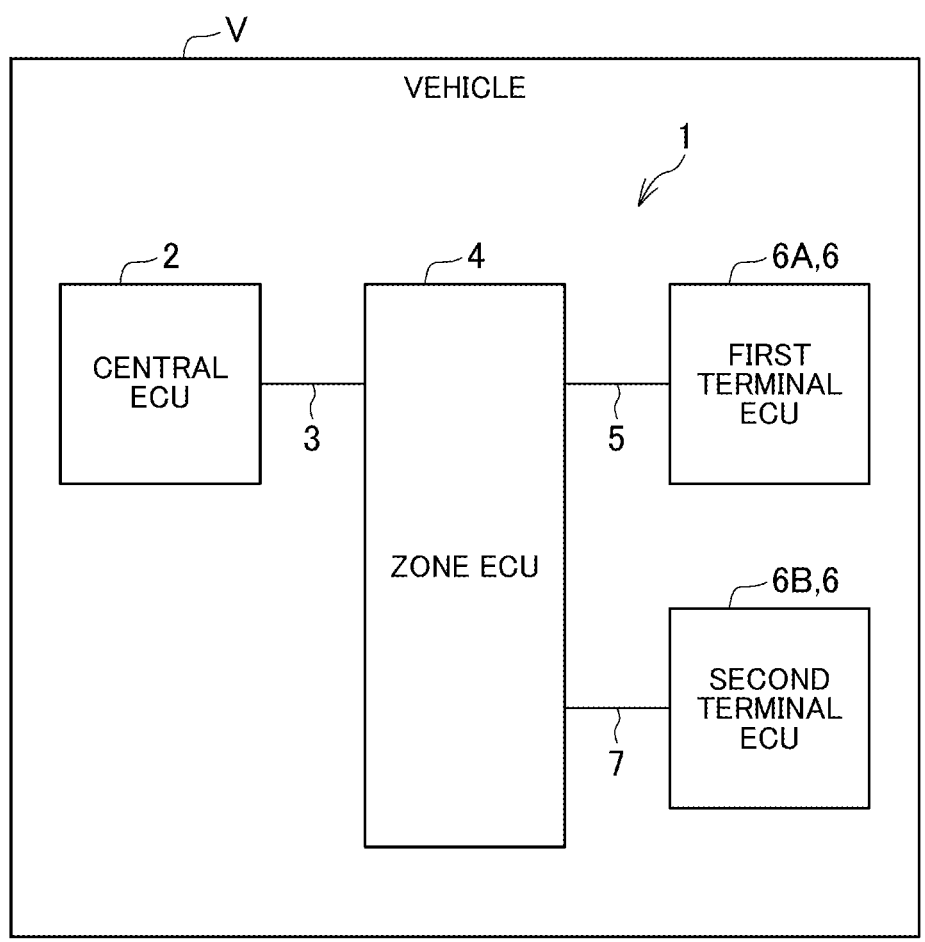
FIG. 1 is a diagram showing a configuration of a vehicle control system.

FIG. 1 is a diagram showing the configuration of a vehicle control system 1 that controls a vehicle V.

The vehicle control system 1 is a system that controls the vehicle V. The vehicle control system 1 includes a central ECU (Electronic Control Unit) 2 that performs overall control and information processing of the vehicle V. The central ECU 2 executes OTA (Over The Air) management. The OTA management includes control regarding processing for downloading an update program of an in-vehicle device provided in the vehicle V from a server outside the vehicle and processing for applying the downloaded update program to the in-vehicle device.

The central ECU 2 corresponds to a "first electronic device" and a "first other electronic device" of the present disclosure.

A zone ECU 4 is connected to the central ECU 2 via a first communication bus 3. The first communication bus 3 is a communication bus complying with Controller Area Network (CAN) standards. To the zone ECU 4, a first terminal ECU 6A is connected via a second communication bus 5, and a second terminal ECU 6B is connected via a third communication bus 7. The zone ECU 4 controls the first terminal ECU 6A and the second terminal ECU 6B. Like the first communication bus 3, the second communication bus 5 and the third communication bus 7 are communication buses complying with the CAN standards.

In the following description, when referring to the first terminal ECU 6A and the second terminal ECU 6B without distinction, "terminal ECU" is used and a reference numeral "6" is applied thereto.

The zone ECU 4 corresponds to a "second electronic device" and an "electronic device" of the present disclosure. The terminal ECU 6 corresponds to a "third electronic device" and a "second other electronic device" of the present disclosure.

As examples of the terminal ECU 6, there may be a VSA (Vehicle Stability Assist) device, a drive device that drives the vehicle V, an air conditioning device, and an ESL (Electronic Steering Lock). Note, however, that the terminal ECU 6 is not limited to those examples but, as will be described later, may be any ECU as long as it has a time counting function.

Figure 2:
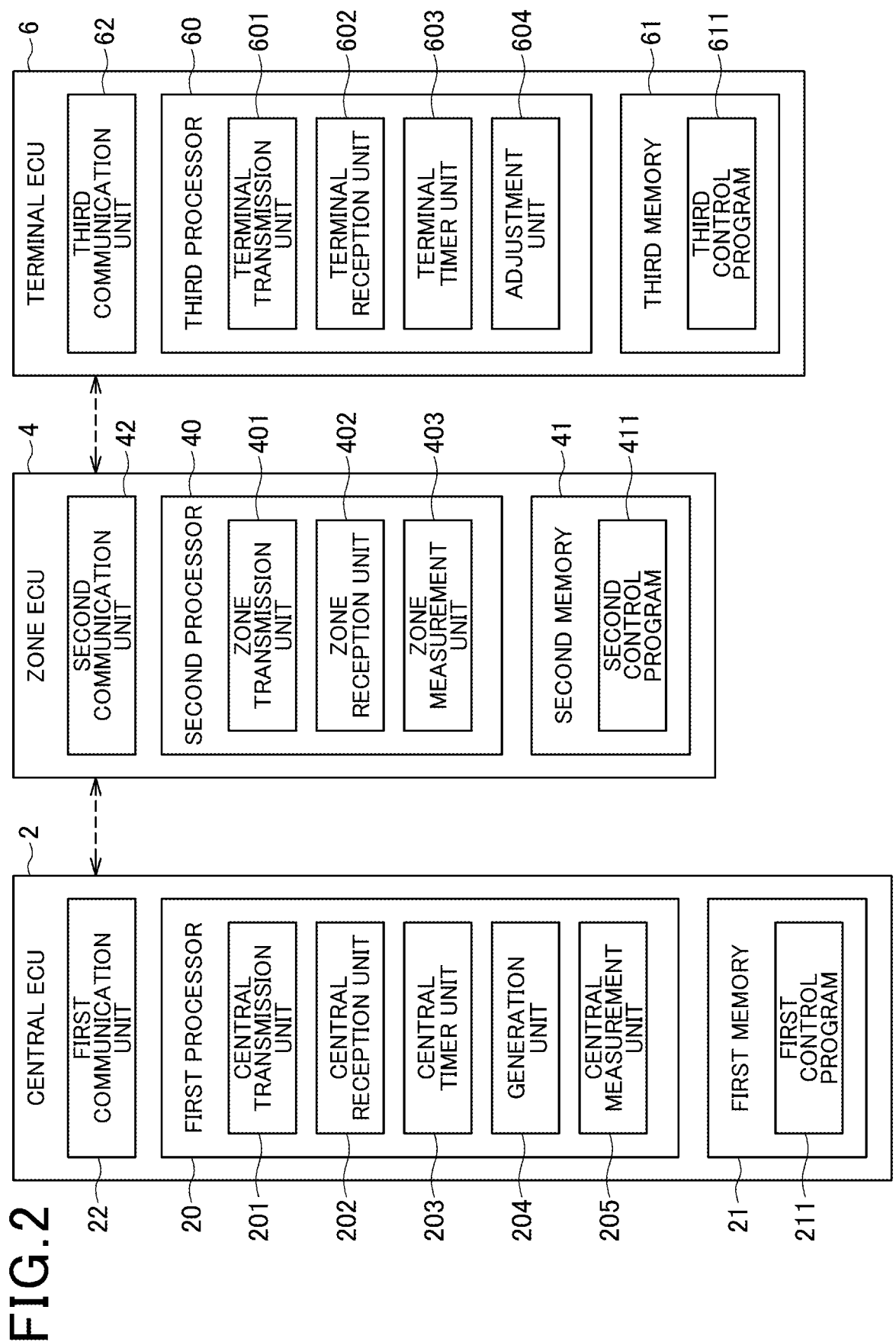
FIG. 2 is a block diagram showing configurations of a central ECU, a zone ECU, and a terminal ECU.

FIG. 2 is a block diagram showing the configurations of the central ECU 2, the zone ECU 4, and the terminal ECU 6.

The central ECU 2 includes a first processor 20 such as a CPU (Central Processing Unit), a first memory 21, and a first communication unit 22.

The first memory 21 is a storage device that stores programs and data executed by the first processor 20. The first memory 21 is configured with a nonvolatile storage device such as a ROM (Read Only Memory), for example. The first memory 21 may also include a volatile storage device configuring a work area of the first processor 20, such as a RAM (Random Access memory), for example. The first memory 21 stores data to be processed by the first processor 20, and a first control program 211 to be executed by the first processor 20.

The first communication unit 22 includes hardware such as a communication circuit and a connector complying with the CAN standards, and communicates with the zone ECU 4 under control of the first processor 20. The first communication bus 3 is connected to the first communication unit 22.

The first processor 20 functions as a central transmission unit 201, a central reception unit 202, a central timer unit 203, a generation unit 204, and a central measurement unit 205 by reading out and executing the first control program 211 stored in the first memory 21.

The central transmission unit 201 corresponds to a "first electronic device transmission unit" of the present disclosure. The central timer unit 203 corresponds to a "first electronic device timer unit" of the present disclosure.

The central transmission unit 201 transmits information to the zone ECU 4 via the first communication unit 22.

The central reception unit 202 receives information from the zone ECU 4 via the first communication unit 22.

The central timer unit 203 counts the time. For example, the central timer unit 203 operates as an RTC (Real Time Clock), and counts the current time.

The generation unit 204 generates time information J1 indicating the time counted by the central timer unit 203. The generation unit 204 outputs the time information J1 generated to the central transmission unit 201. The central transmission unit 201 transmits the time information J1 received from the generation unit 204 to the zone ECU 4.

The central measurement unit 205 measures first elapsed time. The first elapsed time is the time elapsed from the start of generation of the time information J1 till transmission of the time information J1 generated. More specifically, the first elapsed time is the time elapsed from the point where generation of the time information J1 is started till transmission of the time information J1 generated is started. The central measurement unit 205 measures the first elapsed time by measurement means such as a counter, for example.

The zone ECU 4 includes a second processor 40 such as a CPU, a second memory 41, and a second communication unit 42.

The second processor 40 corresponds to a "processor" of the present disclosure. The second memory 41 corresponds to a "second electronic device storage unit" of the present disclosure.

The second memory 41 is a storage device that stores programs and data executed by the second processor 40. The second memory 41 is configured with a nonvolatile storage device such as a ROM, for example. The second memory 41 may also include a volatile storage device configuring a work area of the second processor 40, such as a RAM, for example. The second memory 41 stores data to be processed by the second processor 40, and a second control program 411 to be executed by the second processor 40.

The second control program 411 corresponds to a "program" of the present disclosure.

The second communication unit 42 includes hardware such as a communication circuit and a connector complying with the CAN standards, and communicates with the central ECU 2 and the terminal ECU 6 under control of the second processor 40. The second communication bus 5 and the third communication bus 7 are connected to the second communication unit 42 of the present embodiment to communicate with the first terminal ECU 6A and the second terminal ECU 6B.

The second processor 40 functions as a zone transmission unit 401, a zone reception unit 402, and a zone measurement unit 403 by reading out and executing the second control program 411 stored in the second memory 41.

The zone transmission unit 401 corresponds to a "second electronic device transmission unit" and a "transmission unit" of the present disclosure. The zone reception unit 402 corresponds to a "second electronic device reception unit" and a "reception unit" of the present disclosure. The zone measurement unit 403 corresponds to a "measurement unit" of the present disclosure.

The zone transmission unit 401 transmits information to the central ECU 2 and the terminal ECU 6 via the second communication unit 42.

The zone reception unit 402 receives information from the central ECU 2 and the terminal ECU 6 via the second communication unit 42.

The zone measurement unit 403 measures second elapsed time. The second elapsed time is the time elapsed from when the zone reception unit 402 receives the time information J1 till when the zone transmission unit 401 transmits the time information J1 received to the terminal ECU 6. More specifically, the second elapsed time is the time elapsed from the point where the zone reception unit 402 starts reception of the time information J1 to the point where the zone transmission unit 401 starts transmission of the time information J1 received.

The zone measurement unit 403 measures the second elapsed time by each communication bus connected to the terminal ECU 6, which is a communication bus connected to the zone ECU 4. In the present embodiment, the zone measurement unit 403 measures the second elapsed time for each of the second communication bus 5 and the third communication bus 7.

The zone measurement unit 403 measures the second elapsed time by measurement means such as a counter, for example.

The terminal ECU 6 includes a third processor 60 such as a CPU, a third memory 61, and a third communication unit 62.

The third memory 61 corresponds to a "third electronic device storage unit" of the present disclosure.

The third memory 61 is a storage device that stores programs executed by the third processor 60 as well as data. The third memory 61 is configured with a nonvolatile storage device such as a ROM, for example. The third memory 61 may also include a volatile storage device configuring a work area of the third processor 60, such as a RAM, for example. The third memory 61 stores data to be processed by the third processor 60, and a third control program 611 to be executed by the third processor 60.

The third communication unit 62 includes hardware such as a communication circuit and a connector complying with the CAN standards, and communicates with the zone ECU 4 under control of the third processor 60.

The third processor 60 functions as a terminal transmission unit 601, a terminal reception unit 602, a terminal timer unit 603, and an adjustment unit 604 by reading out and executing the third control program 611 stored in the third memory 61.

The terminal transmission unit 601 corresponds to a "third electronic device transmission unit" of the present disclosure. The terminal reception unit 602 corresponds to a "third electronic device reception unit" of the present disclosure. The terminal timer unit 603 corresponds to a "third electronic device timer unit" of the present disclosure.

The terminal transmission unit 601 transmits information to the zone ECU 4 via the third communication unit 62.

The terminal reception unit 602 receives information from the zone ECU 4 via the third communication unit 62.

The terminal timer unit 603 counts the time. For example, the terminal timer unit 603 operates as an RTC, and counts the current time. The time counted by the terminal timer unit 603 is adjusted by the adjustment unit 604.

The adjustment unit 604 adjusts the time counted by the terminal timer unit 603. Time adjustment performed by the adjustment unit 604 will be described by referring to FIG. 3 and FIG. 4.

Next, operations of the vehicle control system 1 according to the present embodiment will be described.

Figure 3:
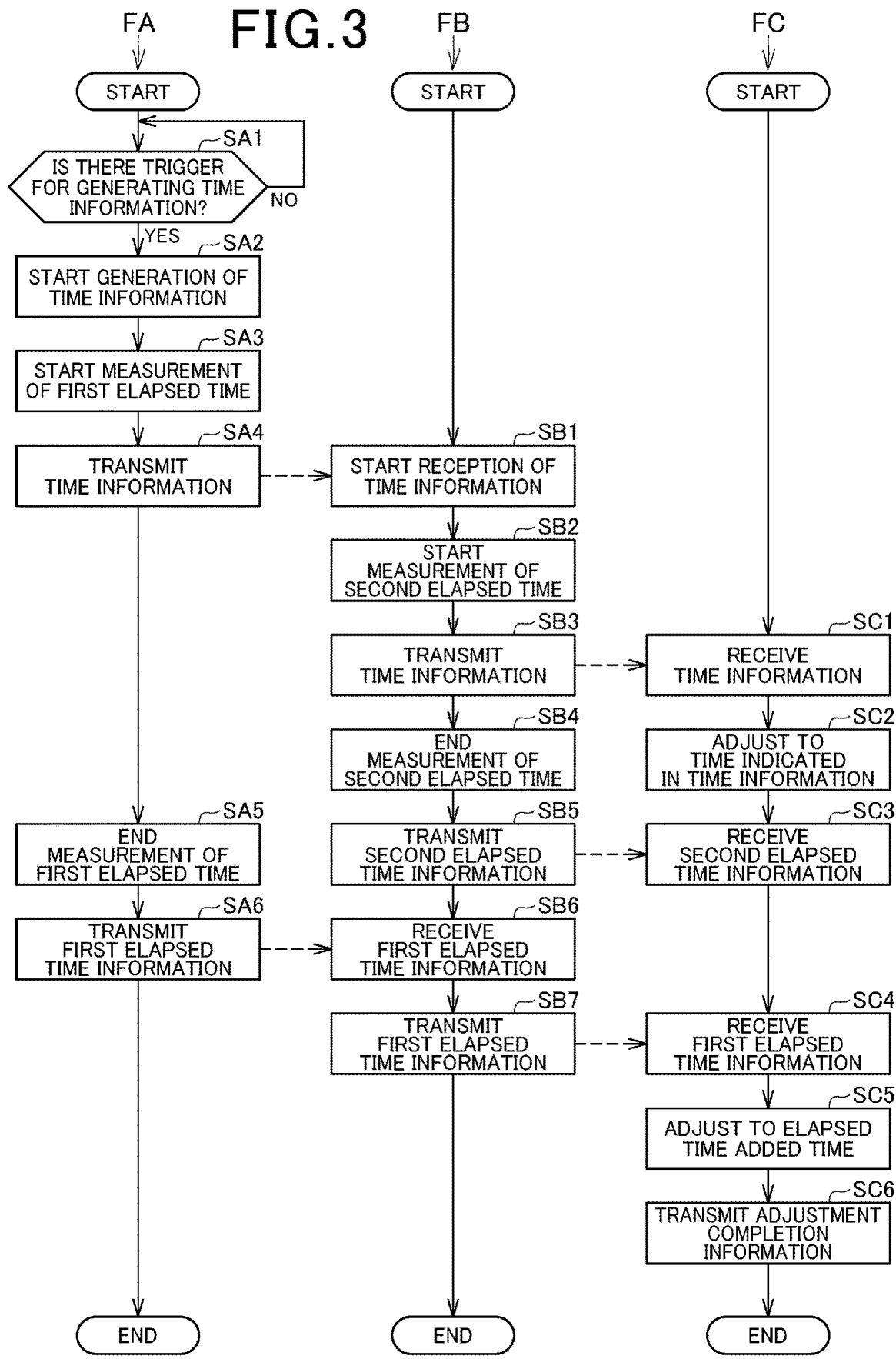
FIG. 3 is a flowchart showing operations of the central ECU, the zone ECU, and the terminal ECU.

FIG. 3 is a flowchart showing the operations of the central ECU 2, the zone ECU 4, and the terminal ECU 6. Operations shown in FIG. 3 are operations related to time synchronization. In FIG. 3, a flowchart FA indicates the operations of the central ECU 2, a flowchart FB indicates the operations of the zone ECU 4, and a flowchart FC indicates the operations of the terminal ECU 6.

As indicated in the flowchart FA, the generation unit 204 determines whether there is a trigger for generating the time information J1 (Step SA1). An example of the trigger may be that it has reached a prescribed period.

When determined that there is no such trigger for generating the time information J1 (NO in Step SA1), the generation unit 204 performs determination of Step SA1 again.

In the meantime, when determined that there is a trigger for generating the time information J1 (YES in Step SA1), the generation unit 204 starts generation of the time information J1 (Step SA2).

Then, the central measurement unit 205 starts measurement of the first elapsed time (Step SA3).

Thereafter, the central transmission unit 201 transmits the time information J1 generated by the generation unit 204 to the zone ECU 4 (Step SA4).

As indicated in the flowchart FB, the zone reception unit 402 starts reception of the time information J1 (Step SB1).

Then, the zone measurement unit 403 starts measurement of the second elapsed time (Step SB2).

Thereafter, when reception of the time information J1 is completed, the zone transmission unit 401 transmits the time information J1 received by the zone reception unit 402 to the terminal ECU 6 (Step SB3).

Then, when transmission of the time information J1 is started, the zone measurement unit 403 ends the measurement of the second elapsed time (Step SB4).

Subsequently, the zone transmission unit 401 transmits second elapsed time information J3 indicating the second elapsed time measured by the zone measurement unit 403 to the terminal ECU 6 (Step SB5).

Returning to the flowchart FA, when transmission of the time information J1 is started, the central measurement unit 205 ends the measurement of the first elapsed time (Step SA5).

Thereafter, the central transmission unit 201 transmits first elapsed time information J2 indicating the first elapsed time measured by the central measurement unit 205 to the zone ECU 4 (Step SA6).

As indicated in the flowchart FB, the zone reception unit 402 receives the first elapsed time information J2 (Step SB6).

Thereafter, the zone transmission unit 401 transmits the first elapsed time information J2 received by the zone reception unit 402 to the terminal ECU 6 (Step SB7).

As indicated in the flowchart FC, the terminal reception unit 602 receives the time information J1 from the zone ECU 4 (Step SC1).

Then, the adjustment unit 604 adjusts the time counted by the terminal timer unit 603 to the time indicated in the time information J1 received in Step SC1 (Step SC2). After the adjustment performed in Step SC2, the terminal timer unit 603 counts the time from the time indicated in the time information J1 received in Step SC1 as the basis.

Then, the terminal reception unit 602 receives the second elapsed time information J3 from the zone ECU 4 (Step SC3).

Thereafter, the terminal reception unit 602 receives the first elapsed time information J2 from the zone ECU 4 (Step SC4).

Then, the adjustment unit 604 adjusts the time counted by the terminal timer unit 603 to elapsed time added time (Step SC5). Elapsed time added time is the time acquired by adding the first elapsed time indicated in the first elapsed time information J2 received in Step SC3 and the second elapsed time indicated in the second elapsed time information J3 received in Step SC4 to the time that is counted by the terminal timer unit 603 from the time adjusted in Step SC2 as the basis.

Then, the terminal transmission unit 601 transmits adjustment completion information to the central ECU 2 via the zone ECU 4 (Step SC6). The adjustment completion information is the information indicating that adjustment of the time is completed. In the vehicle control system 1, the ECUs are connected in order of the central ECU 2, the ZONE ECU 4, and the terminal ECU 6. Thus, when time synchronization is completed in the terminal ECU 6, it is considered that time synchronization is completed through the whole system. Therefore, transmission of the adjustment completion information from the terminal ECU 6 to the central ECU 2 allows the central ECU 2 to grasp whether time synchronization is completed through the whole system.

Figure 4:
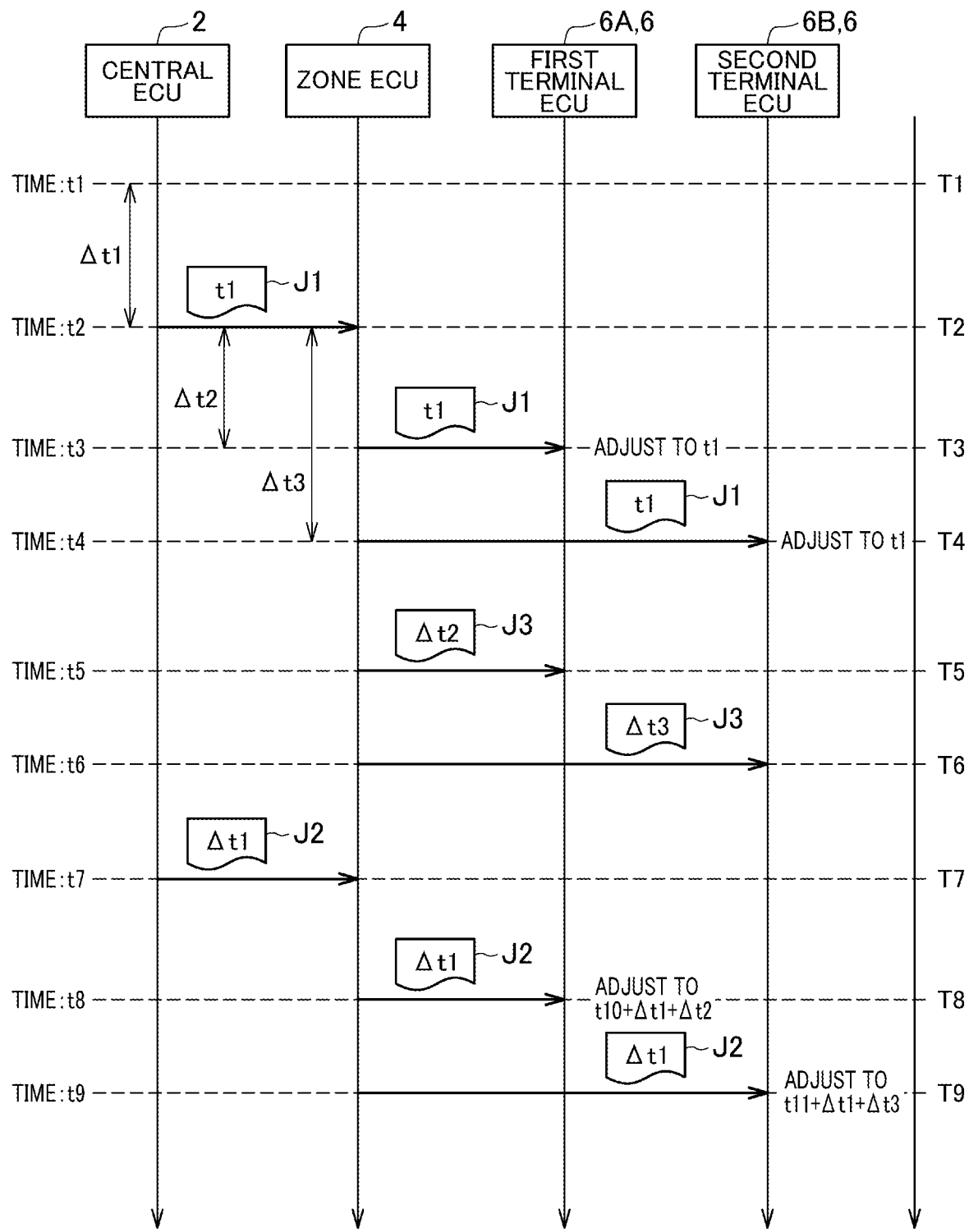
FIG. 4 is a diagram for describing time synchronization in a specific manner.

Referring to FIG. 4, time synchronization between the central ECU 2 and the terminal ECUs 6 will be described in a specific manner. FIG. 4 is a diagram for describing time synchronization in a specific manner.

At a timing T1, the generation unit 204 of the central ECU 2 starts generation of the time information J1. The timing T1 is the timing of a case where the time counted by the central timer unit 203 is "t1".

At a timing T2, the central transmission unit 201 transmits the time information J1 indicating the start of generation at the timing T1 to the zone ECU 4. The timing T2 is the timing of a case where the time counted by the central timer unit 203 is "t2". The time "t2" is the time advanced by "Δt1" from the time "t1". The time information J1 transmitted at the timing T2 indicates "t1" that is the time at which generation is started.

At the timing T2, the zone reception unit 402 receives the time information J1 from the central ECU 2. Furthermore, at the timing T2, the zone measurement unit 403 starts measurement of the second elapsed time for each of the first terminal ECU 6A and the second terminal ECU 6B.

At a timing T3, the zone transmission unit 401 transmits the time information J1 received from the central ECU 2 to the first terminal ECU 6A. The timing T3 is the timing of a case where the time counted by the central timer unit 203 is "t3". The time "t3" is the time advanced by "Δt2" from the time "t2".

At the timing T3, the zone measurement unit 403 ends the measurement of the second elapses time for the first terminal ECU 6A. Note that, at the timing T3, the zone measurement unit 403 continues the measurement of the second elapsed time for the second terminal ECU 6B.

When the terminal reception unit 602 of the first terminal ECU 6A receives the time information J1 at the timing T3, the adjustment unit 604 of the first terminal ECU 6A adjusts the time counted by the terminal timer unit 603 of the first terminal ECU 6A to the time "t1" indicated in the time information J1 received. After the adjustment, the terminal timer unit 603 of the first terminal ECU 6A counts the time from the time "t1" as the basis.

At a timing T4, the zone transmission unit 401 transmits the time information J1 received from the central ECU 2 to the second terminal ECU 6B. The timing T4 is the timing of a case where the time counted by the central timer unit 203 is "t4". The time "t4" is the time advanced by "Δt3" from the time "t2".

At the timing T4, the zone measurement unit 403 ends the measurement of the second elapsed time for the second terminal ECU 6B.

When the terminal reception unit 602 of the second terminal ECU 6B receives the time information J1 at the timing T4, the adjustment unit 604 of the second terminal ECU 6B adjusts the time counted by the terminal timer unit 603 of the second terminal ECU 6B to the time "t1" indicated in the time information J1 received. After the adjustment, the terminal timer unit 603 of the second terminal ECU 6B counts the time from the time "t1" as the basis.

At a timing T5, the zone transmission unit 401 transmits the second elapsed time information J3 to the first terminal ECU 6A. The second elapsed time indicated in the second elapsed time information J3 transmitted to the first terminal ECU 6A is the second elapsed time measured by the zone measurement unit 403, and it is the second elapsed time regarding the first terminal ECU 6A. The second elapsed time information J3 transmitted at the timing T5 indicates the second elapsed time of "Δt2". Note that the timing T5 is the timing where the time counted by the central timer unit 203 indicates "t5". The time "t5" is the time advanced from the time "t4".

At a timing T6, the zone transmission unit 401 transmits the second elapsed time information J3 to the second terminal ECU 6B. The second elapsed time indicated in the second elapsed time information J3 transmitted to the second terminal ECU 6B is the second elapsed time measured by the zone measurement unit 403, and it is the second elapsed time regarding the second terminal ECU 6B. The second elapsed time information J3 transmitted at the timing T6 indicates the second elapsed time of "Δt3". Note that the timing T6 is the timing where the time counted by the central timer unit 203 indicates "t6". The time "t6" is the time advanced from the time "t5".

At a timing T7, the central transmission unit 201 transmits the first elapsed time information J2 indicating the first elapsed time measured by the central measurement unit 205 to the zone ECU 4. The timing T7 is the timing where time counted by the central timer unit 203 indicates "t7". The time "t7" is the time advanced from the time "t6". The first elapsed time information J2 transmitted at the timing T7 indicates the first elapsed time of "Δt1".

At a timing T8, the zone transmission unit 401 transmits the time information J1 received from the central ECU 2 to the first terminal ECU 6A. The timing T8 is the timing where the time counted by the central timer unit 203 indicates "t8". The time "t8" is the time advanced from the time "t7".

When the terminal reception unit 602 of the first terminal ECU 6A receives the first elapsed time information J2 at the timing T8, the adjustment unit 604 of the first terminal ECU 6A adjusts the time counted by the terminal timer unit 603 of the first terminal ECU 6A to time "t10+Δt1+Δt2". The time "t10+Δt1+Δt2" is the elapsed time added time acquired by adding the time "t10", the second elapsed time of "Δt2" indicated in the second elapsed time information J3 received at the timing 15, and the first elapsed time of "Δt1" indicated in the first elapsed time information J2 received at the timing T8. The time "t10" indicates the time counted by the terminal timer unit 603 of the first terminal ECU 6A from the time "t1" as the basis to the timing T8, after the adjustment of the time "t1".

At a timing T9, the zone transmission unit 401 transmits the time information J1 received from the central ECU 2 to the second terminal ECU 6B. The timing T9 is the timing where the time counted by the central timer unit 203 indicates "t9". The time "t9" is the time advanced from the time "t8".

When the terminal reception unit 602 of the second terminal ECU 6B receives the first elapsed time information J2 at the timing T9, the adjustment unit 604 of the second terminal ECU 6B adjusts the time counted by the terminal timer unit 603 of the second terminal ECU 6B to time "t11+Δt1+Δt3". The time "t11+Δt1+Δt3" is the elapsed time added time acquired by adding the time "t11", the second elapsed time of "Δt3" indicated in the second elapsed time information J3 received at the timing T6, and the first elapsed time of "Δt1" indicated in the first elapsed time information J2 received at the timing T9. The time "t11" indicates the time counted by the terminal timer unit 603 of the second terminal ECU 6B from the time "t1" as the basis to the timing T9, after the adjustment of the time "t1".

2. Second Embodiment

Next, a second embodiment will be described.

In the description of the second embodiment, same reference signs are applied to the structural elements that are same as those of each unit of the vehicle control system 1 according to the first embodiment, and detailed explanations thereof are omitted as appropriate.

In the second embodiment, the zone ECU 4 stores the received first elapsed time information J2, and transmits the stored first elapsed time information J2 to the terminal ECU 6.

In the second embodiment, upon receiving the first elapsed time information J2 from the central ECU 2, the zone reception unit 402 stores the received first elapsed time information J2 in the second memory 41. Then, when the first elapsed time information J2 is stored in the second memory 41, the zone transmission unit 401 transmits first stop information to the central ECU 2. The first stop information is the information for stopping transmission of the first elapsed time information J2. When the central ECU 2 receives the first stop information, the central timer unit 203 stops measurement of the first elapsed time. Furthermore, when the central ECU 2 receives the first stop information, the central transmission unit 201 transmits the time information J1 but does not transmit the first elapsed time information J2 even when there is a trigger for generating the time information J1.

After transmitting the first stop information, that is, after storing the first elapsed time information J2, when the zone ECU 4 receives the time information J1 from the central ECU 2, the zone transmission unit 401 transmits, to the terminal ECU 6, the time information J1 received, the second elapsed time information J3 indicating the second elapsed time measured by the zone measurement unit 403, and the first elapsed time information J2 stored in the second memory 41. As in the case of the first embodiment, the terminal ECU 6 performs time synchronization based on the time information J1, the first elapsed time information J2, and the second elapsed time information J3.

3. Third Embodiment

Next, a third embodiment will be described.

In the description of the third embodiment, same reference signs are applied to the structural elements that are same as those of each unit of the vehicle control system 1 according to the first embodiment, and detailed explanations thereof are omitted as appropriate.

In the third embodiment, the terminal ECU 6 stores the received second elapsed time information J3, and performs time synchronization based on the stored second elapsed time information J3.

In the third embodiment, upon receiving the second elapsed time information J3 from the zone ECU 4, the terminal reception unit 602 stores the received second elapsed time information J3 in the third memory 61. Then, when the second elapsed time information J3 is stored in the third memory 61, the terminal transmission unit 601 transmits second stop information to the zone ECU 4. The second stop information is the information for stopping transmission of the second elapsed time information J3. When the zone ECU 4 receives the second stop information, the zone measurement unit 403 stops measurement of the second elapsed time. Furthermore, when the zone ECU 4 receives the second stop information, the zone transmission unit 401 transmits the time information J1 and the first elapsed time information J2 to the terminal ECU 6 but does not transmit the second elapsed time information J3 to the terminal ECU 6.

After transmitting the second stop information, that is, after storing the second elapsed time information J3, when the terminal ECU 6 receives the time information J1 again from the zone ECU 4, the adjustment unit 604 adjusts the time as in the case of the first embodiment based on the time information J1 received from the zone ECU 4, the second elapsed time information J3 stored in the third memory 61, and the first elapsed time information J2 received from the zone ECU 4.

4. Fourth Embodiment

Next, a fourth embodiment will be described.

In the description of the fourth embodiment, same reference signs are applied to the structural elements that are same as those of each unit of the vehicle control system 1 according to the first embodiment, and detailed explanations thereof are omitted as appropriate.

The fourth embodiment is the embodiment that is a combination of the second embodiment and the third embodiment. That is, in the fourth embodiment, the zone ECU 4 stores the received first elapsed time information J2 and transmits the stored first elapsed time information J2 to the terminal ECU 6, as in the case of the second embodiment. Furthermore, in the fourth embodiment, the terminal ECU 6 stores the received second elapsed time information J3 and performs time synchronization based on the stored second elapsed time information J3, as in the case of the third embodiment.

In the fourth embodiment, when the zone ECU 4 transmits the first stop information and the terminal ECU 6 transmits the second stop information, the central ECU 2 transmits the time information J1 to the zone ECU 4, and the zone ECU 4 transmits the time information J1 and the first elapsed time information J2 stored in the second memory 41 to the terminal ECU 6. Then, the adjustment unit 604 adjusts the time as in the case of the first embodiment based on the time information J1 received, the second elapsed time information J3 stored in the third memory 61, and the first elapsed time information J2 received from the zone ECU 4.

5. Another Embodiment

Each of the embodiments described above merely indicates one aspect, and modification and application thereof are possible as desired.

The second embodiment and the fourth embodiment described above are configured such that, when the central ECU 2 once transmits the first elapsed time information J2, retransmission of the first elapsed time information J2 is not performed. In another embodiment, when a trigger for generating the time information J1 occurs for a prescribed number of times or more, the central ECU 2 may measure the first elapsed time and transmit the first elapsed time information J2. In a case of such a configuration, upon receiving the first elapsed time information J2 again, the zone ECU 4 updates the first elapsed time information J2 stored in the second memory 41 to the latest first elapsed time information J2, and transmits the updated first elapsed time information J2 to the terminal ECU 6.

The third embodiment and the fourth embodiment described above are configured such that, when the zone ECU 4 once transmits the second elapsed time information J3, retransmission of the second elapsed time information J3 is not performed. In another embodiment, when the zone ECU 4 receives the time information J1 from the central ECU 2 for a prescribed number of times or more, the zone ECU 4 may measure the second elapsed time and transmit the second elapsed time information J3. In a case of such a configuration, upon receiving the second elapsed time information J3 again, the terminal ECU 6 adjusts the time counted by the terminal timer unit 603 based on the latest received second elapsed time information J3, and updates the second elapsed time information J3 stored in the third memory 61 to the latest second elapsed time information J3.

In another embodiment, the terminal ECU 6 may store the received first elapsed time information J2 and second elapsed time information J3, and perform time synchronization based on the stored first elapsed time information J2 and second elapsed time information J3.

In another embodiment described herein, upon receiving the first elapsed time information J1 and the second elapsed time information J3 from the zone ECU 4, the terminal reception unit 602 stores the received first elapsed time information J1 and second elapsed time information J3 in the third memory 61. Then, when the first elapsed time information J1 and the second elapsed time information J3 are stored in the third memory 61, the terminal transmission unit 601 transmits third stop information to the central ECU 2 and the zone ECU 4. The third stop information is the information for stopping transmission of the information except for the time information J1 among the pieces of information related to time synchronization. When the central ECU 2 receives the third stop information, the central timer unit 203 stops measurement of the first elapsed time. Furthermore, when the central ECU 2 receives the third stop information, the central transmission unit 201 transmits the time information J1 but does not transmit the first elapsed time information J2 when there is a trigger for generating the time information J1. When the zone ECU 4 receives the third stop information, the zone measurement unit 403 stops measurement of the second elapsed time. Furthermore, when the zone ECU 4 receives the third stop information, the zone transmission unit 401, upon receiving the time information J1 from the central ECU 2, transmits the time information J1 to the terminal ECU 6 but does not transmit the second elapsed time information J3 to the terminal ECU 6.

Furthermore, in another embodiment described herein, after transmitting the third stop information, that is, after storing the first elapsed time information J2 and the second elapsed time information J3, when the terminal ECU 6 receives the time information J1 again, the adjustment unit 604 adjusts the time as in the case of the first embodiment based on the time information J1 received and the first elapsed time information J2 as well as the second elapsed time information J3 stored in the third memory 61.

In the embodiments described above, there is a single zone ECU 4 connected to the central ECU 2. However, there may be a plurality of zone ECUs 4 that are connected to the central ECU 2. Furthermore, while there are two terminal ECUs 6 connected to the zone ECU 4, there may also be a single terminal ECU 6 or may be three or more terminal ECUs 6 that are connected to the zone ECU 4.

The first processor 20, the second processor 40, and the third processor 60 may be configured with a plurality of processors or may be configured with a single processor. Those processors may also be hardware programmed to implement the above-described functional units. In that case, those processors may be configured with ASIC (Application Specific Integrated Circuit) or FPGA (Field Programmable Gate Array), for example.

Furthermore, the configurations of each of the units of the vehicle control system 1 shown in FIG. 2 are presented as an example only, and there is no specific limit set for the concrete implementation forms thereof. That is, hardware individually corresponding to each of the units does not necessarily need to be mounted, and it is certainly possible to implement functions of each of the units by executing a program by a single processor. Furthermore, part of the functions implemented by software in the embodiments described above may be configured with hardware, or part of the functions implemented by hardware may be implemented by software.

Furthermore, step units of the operations shown in FIG. 3 are divided in accordance with the main processing contents, and the present disclosure is not limited by the manner the processing units are divided and the names thereof. The operations may be divided into a greater number of step units in accordance with the processing contents. Furthermore, a single step unit may be divided to include more processing. Moreover, the order of the steps may be changed as appropriate without departing from the scope of the present disclosure.

Furthermore, when a control method of the above-described vehicle control system 1 is to be implemented by using a processor, the program to be executed by the processor can be configured with a mode of recording medium or a mode of transmission medium that transmits the program. That is, the first control program 211 can also be implemented in a state where the first control program 211 is recorded on a removable information recording medium. While examples of the information recording medium may be a magnetic recording medium such as a hard disk, an optical recording medium such as a CD, and semiconductor memory devices such as a USB (Universal Serial Bus) memory and an SSD (Solid State Drive), it is also possible to use other recording media. Furthermore, as in the case of the first control program 211, the second control program 411 can be implemented in a state where the second control program 411 is recorded on a removable information recording medium. Moreover, as in the case of the first control program 211, the third control program 611 can be implemented in a state where the third control program 611 is recorded on a removable information recording medium.

6. Configuration Supported by the Embodiments

The above-described embodiments support the following configurations.

(Configuration 1) A vehicle control system including a first electronic device, a second electronic device connected to the first electronic device, and a third electronic device connected to the second electronic device, in which the first electronic device includes: a first electronic device timer unit; a generation unit that generates time information indicating time counted by the first electronic device timer unit; and a first electronic device transmission unit that transmits the time information generated by the generation unit to the second electronic device, the first electronic device transmission unit also transmitting, to the second electronic device, first elapsed time information indicating first elapsed time that is from when the generation unit starts generation of the time information till transmitting the time information generated, the second electronic device includes: a second electronic device reception unit that receives the time information and the first elapsed time information from the first electronic device; and a second electronic device transmission unit that transmits the time information and the first elapsed time information received by the second electronic device reception unit to the third electronic device, and the third electronic device includes: a third electronic device timer unit; a third electronic device reception unit that receives the time information and the first elapsed time information from the second electronic device; and an adjustment unit that adjusts time counted by the third electronic device timer unit based on the time information and the first elapsed time information received by the third electronic device reception unit.

According to the vehicle control system of Configuration 1, the third electronic device can adjust the time to be counted by considering the elapsed time from the start of generation of the time information till transmission of the time information. Therefore, it is possible to implement time synchronization among the electronic devices with high precision. Furthermore, according to the vehicle control system of Configuration 1, time synchronization among the electronic devise can be implemented without having round-trip communication among the electronic devices, so that it possible to decrease the communication traffic amount related to time synchronization.

(Configuration 2) The vehicle control system according to Configuration 1, in which the second electronic device transmission unit transmits, to the third electronic device, second elapsed time information indicating second elapsed time that is from when the second electronic device reception unit receives the time information till when the second electronic device transmission unit transmits the time information, the third electronic device reception unit receives the second elapsed time information, and the adjustment unit adjusts the time counted by the third electronic device timer unit based on the time information, the first elapsed time information, and the second elapsed time information received by the third electronic device reception unit.

According to the vehicle control system of Configuration 2, the third electronic device can adjust the time to be counted by also considering transfer time of the time information in the second electronic device. Therefore, it is possible to implement time synchronization among the electronic devices with higher precision.

(Configuration 3) The vehicle control system according to Configuration 2, in which the adjustment unit adjusts the time counted by the third electronic device timer unit based on time acquired by adding the time indicated in the time information, the first elapsed time indicated in the first elapsed time information, and the second elapsed time indicated in the second elapsed time information.

According to the vehicle control system of Configuration 3, the time counted by the second timer unit is adjusted based on the time acquired by adding the time indicated in the time information, the first elapsed time indicated in the first elapsed time information, and the second elapsed time indicated in the second elapsed time information. Therefore, the time counted by the third electronic device can be synchronized with the time counted by the first electronic device with high precision. As a result, time synchronization among the electronic devices can be implemented with higher precision.

(Configuration 4) The vehicle control system according to Configuration 2 or 3, in which a plurality of the third electronic devices are connected to the second electronic device, communication buses connecting the second electronic device and the respective third electronic devices are different for each of the third electronic devices, the second electronic device includes a measurement unit that measures the second elapsed time for each of the communication buses, and the second electronic device transmission unit transmits the second elapsed time information indicating the second elapsed time that is measured by the measurement unit.

According to the vehicle control system of Configuration 4, the second elapsed time is measured for each of the communication buses, so that it is possible to implement time synchronization among the electronic devices with high precision even when a plurality of third electronic devices are connected to the second electronic device via different communication buses.

(Configuration 5) The vehicle control system according to any one of Configurations 1 to 4, in which the second electronic device includes a second electronic device storage unit that stores the first elapsed time information received by the second electronic device reception unit, and when the second electronic device reception unit receives the time information after receiving the first elapsed time information, the second electronic device transmission unit transmits, to the third electronic device, the time information received by the second electronic device reception unit and the first elapsed time information stored in the second electronic device storage unit.

According to the vehicle control system of Configuration 5, the second electronic device stores the first elapsed time information received from the first electronic device, so that the first electronic device only needs to transmit the time information for the next time synchronization and thereafter. Therefore, it is possible to decrease the communication traffic amount and also implement time synchronization among the electronic devices with high precision.

(Configuration 6) The vehicle control system according to any one of Configurations 2 to 5, in which the third electronic device includes a third electronic device storage unit that stores the second elapsed time information received by the third electronic device reception unit, and when the third electronic device reception unit receives the time information after receiving the second elapsed time information, the adjustment unit adjusts the time counted by the third electronic device timer unit based on the time information received by the third electronic device reception unit, the first elapsed time information received by the third electronic device reception unit, and the second elapsed time information stored in the third electronic device storage unit.

According to the vehicle control system of Configuration 6, the third electronic device stores the second elapsed time information received from the second electronic device, so that the second electronic device only needs to transmit the time information for the next time synchronization and thereafter. Therefore, it is possible to decrease the communication traffic amount and also implement time synchronization among the electronic devices with high precision.

(Configuration 7) The vehicle control system according to any one of Configurations 1 to 6, in which the third electronic device includes a third electronic device transmission unit that transmits adjustment completion information indicating completion of time adjustment to the first electronic device via the second electronic device, after the time counted by the third electronic device timer unit is adjusted.

According to the vehicle control system of Configuration 7, the third electronic device transmits the adjustment completion information to the first electronic device, so that the first electronic device can grasp the timing at which time synchronization is completed through the whole system.

(Configuration 8) The vehicle control system according to any one of Configurations 1 to 7, in which the first electronic device, the second electronic device, and the third electronic device communicate with each other according to CAN standards.

According to the vehicle control system of Configuration 8, it is possible to implement time synchronization among the electronic devices with high precision, even when the first electronic device, the second electronic device, and the third electronic device communicate with each other according to the CAN standards. Therefore, time synchronization can be implemented between the electronic devices with high precision while achieving cost reduction of the vehicle control system.

(Configuration 9) A control method of a vehicle control system including a first electronic device, a second electronic device connected to the first electronic device, and a third electronic device connected to the second electronic device, the control method including: generating, by the first electronic device, time information indicating time counted by the first electronic device; transmitting, by the first electronic device, the time information generated to the second electronic device; transmitting, by the first electronic device, to the second electronic device, first elapsed time information indicating first elapsed time from start of generation of the time information till transmission of the time information generated; receiving, by the second electronic device, the time information and the first elapsed time information from the first electronic device; transmitting, by the second electronic device, the time information and the first elapsed time information received to the third electronic device; receiving, by the third electronic device, the time information and the first elapsed time information from the second electronic device; and adjusting, by the third electronic device, time to be counted based on the time information and the first elapsed time information received.

According to the control method of the vehicle control system of Configuration 9, the same effect as that of the vehicle control system of Configuration 1 can be achieved.

(Configuration 10) An electronic device provided in a vehicle, the electronic device including: a reception unit that receives, from a first other electronic device, time information indicating time counted by the first other electronic device and first elapsed time information indicating first elapsed time that is from when the first other electronic device starts generation of the time information till when the first other electronic device transmits the time information generated; and a transmission unit that transmits the time information and the first elapsed time information received by the reception unit to a second other electronic device.

According to the electronic device of Configuration 10, the second other electronic device can adjust the time to be counted by considering the elapsed time from the start of generation of the time information till transmission of the time information. Therefore, it is possible to implement time synchronization among the electronic devices with high precision.

(Configuration 11) A non-transitory computer readable recording medium recording a program causing a processor of an electronic device provided in a vehicle to function as: a reception unit that receives, from a first other electronic device, time information indicating time counted by the first other electronic device and first elapsed time information indicating first elapsed time that is from when the first other electronic device starts generation of the time information till when the first other electronic device transmits the time information generated; and a transmission unit that transmits the time information and the first elapsed time information received by the reception unit to a second other electronic device.

According to the recording medium of Configuration 11, the same effect as that of the electronic device of Configuration 10 can be achieved.

REFERENCE SIGNS LIST

1 Vehicle control system
2 Central ECU (first electronic device, first other electronic device)
3 First communication bus
4 Zone ECU (second electronic device, electronic device)
5 Second communication bus
6 Terminal ECU (third electronic device, second other electronic device)
6A First terminal ECU (third electronic device, second other electronic device)
6B Second terminal ECU (third electronic device, second other electronic device)
7 Third communication bus
20 First processor
21 First memory
22 First communication unit
40 Second processor (processor)
41 Second memory (second electronic device storage unit)
42 Second communication unit
60 Third processor
61 Third memory (third electronic device storage unit)
62 Third communication unit
201 Central transmission unit (first electronic device transmission unit)
202 Central reception unit
203 Central timer unit (first electronic device timer unit)
204 Generation unit
205 Central measurement unit
211 First control program
401 Zone transmission unit (second electronic device transmission unit, transmission unit)
402 Zone reception unit (second electronic device reception unit, reception unit)
403 Zone measurement unit (measurement unit)
411 Second control program (program)
601 Terminal transmission unit (third electronic device transmission unit)
602 Terminal reception unit (third electronic device reception unit)
603 Terminal timer unit (third electronic device timer unit)
604 Adjustment unit
611 Third control program
J1 Time information
J2 First elapsed time information
J3 Second elapsed time information
V Vehicle

What is claimed is:

1. A vehicle control system comprising a first electronic device, a second electronic device connected to the first electronic device, and a third electronic device connected to the second electronic device, wherein
the first electronic device comprises a first processor that includes:
a first electronic device timer unit;
a generation unit that generates time information indicating time counted by the first electronic device timer unit; and
a first electronic device transmission unit that transmits the time information generated by the generation unit to the second electronic device, the first electronic device transmission unit also transmitting, to the second electronic device, first elapsed time information indicating first elapsed time that is from when the generation unit starts generation of the time information till transmitting the time information generated,
the second electronic device comprises a second processor that includes:
a second electronic device reception unit that receives the time information and the first elapsed time information from the first electronic device; and
a second electronic device transmission unit that transmits the time information and the first elapsed time information received by the second electronic device reception unit to the third electronic device, and the third electronic device comprises a third processor that includes:
- a third electronic device timer unit;
- a third electronic device reception unit that receives the time information and the first elapsed time information from the second electronic device; and
- an adjustment unit that adjusts time counted by the third electronic device timer unit based on the time information and the first elapsed time information received by the third electronic device reception unit.

2. The vehicle control system according to claim 1, wherein
the second electronic device transmission unit transmits, to the third electronic device, second elapsed time information indicating second elapsed time that is from when the second electronic device reception unit receives the time information till when the second electronic device transmission unit transmits the time information,
the third electronic device reception unit receives the second elapsed time information, and
the adjustment unit adjusts the time counted by the third electronic device timer unit based on the time information, the first elapsed time information, and the second elapsed time information received by the third electronic device reception unit.

3. The vehicle control system according to claim 2, wherein the adjustment unit adjusts the time counted by the third electronic device timer unit based on time acquired by adding the time indicated in the time information, the first elapsed time indicated in the first elapsed time information, and the second elapsed time indicated in the second elapsed time information.

4. The vehicle control system according to claim 2, wherein
a plurality of the third electronic devices are connected to the second electronic device,
communication buses connecting the second electronic device and the respective third electronic devices are different for each of the third electronic devices,
the second processor of the second electronic device comprises a measurement unit that measures the second elapsed time for each of the communication buses, and
the second electronic device transmission unit transmits the second elapsed time information indicating the second elapsed time that is measured by the measurement unit.

5. The vehicle control system according to claim 2, wherein
the third electronic device comprises a third memory that stores the second elapsed time information received by the third electronic device reception unit, and
when the third electronic device reception unit receives the time information after receiving the second elapsed time information, the adjustment unit adjusts the time counted by the third electronic device timer unit based on the time information received by the third electronic device reception unit, the first elapsed time information received by the third electronic device reception unit, and the second elapsed time information stored in the third memory.

6. The vehicle control system according to claim 1, wherein
the second electronic device comprises a second memory that stores the first elapsed time information received by the second electronic device reception unit, and
when the second electronic device reception unit receives the time information after receiving the first elapsed time information, the second electronic device transmission unit transmits, to the third electronic device, the time information received by the second electronic device reception unit and the first elapsed time information stored in the second memory.

7. The vehicle control system according to claim 1, wherein the third processor of the third electronic device comprises a third electronic device transmission unit that transmits adjustment completion information indicating completion of time adjustment to the first electronic device via the second electronic device, after the time counted by the third electronic device timer unit is adjusted.

8. The vehicle control system according to claim 1, wherein the first electronic device, the second electronic device, and the third electronic device communicate with each other according to CAN (Controller Area Network) standards.

9. A control method of a vehicle control system comprising a first electronic device, a second electronic device connected to the first electronic device, and a third electronic device connected to the second electronic device, the control method comprising:
generating, by the first electronic device, time information indicating time counted by the first electronic device;
transmitting, by the first electronic device, the time information generated to the second electronic device;
transmitting, by the first electronic device, to the second electronic device, first elapsed time information indicating first elapsed time from start of generation of the time information till transmission of the time information generated;
receiving, by the second electronic device, the time information and the first elapsed time information from the first electronic device;
transmitting, by the second electronic device, the time information and the first elapsed time information received to the third electronic device;
receiving, by the third electronic device, the time information and the first elapsed time information from the second electronic device; and
adjusting, by the third electronic device, time to be counted based on the time information and the first elapsed time information received.

* * * * *